US011733446B2

(12) United States Patent
Hudman et al.

(10) Patent No.: US 11,733,446 B2
(45) Date of Patent: Aug. 22, 2023

(54) POLARIZATION-BASED MULTIPLEXING OF DIFFRACTIVE ELEMENTS FOR ILLUMINATION OPTICS

(71) Applicant: Valve Corporation, Bellevue, WA (US)

(72) Inventors: Joshua Mark Hudman, Issaquah, WA (US); Kameron Wade Rausch, Sammamish, WA (US)

(73) Assignee: Valve Corporation, Bellevue, WA (US)

( * ) Notice: Subject to any disclaimer, the term of this patent is extended or adjusted under 35 U.S.C. 154(b) by 259 days.

(21) Appl. No.: 17/170,500

(22) Filed: Feb. 8, 2021

(65) Prior Publication Data

US 2021/0247556 A1 Aug. 12, 2021

Related U.S. Application Data

(60) Provisional application No. 62/975,064, filed on Feb. 11, 2020.

(51) Int. Cl.
*G02B 5/30* (2006.01)
*G02B 27/01* (2006.01)
(Continued)

(52) U.S. Cl.
CPC .......... *G02B 5/3083* (2013.01); *G02B 5/3016* (2013.01); *G02B 27/0172* (2013.01);
(Continued)

(58) Field of Classification Search
CPC .. G02B 5/3083; G02B 5/3016; G02B 5/1833; G02B 27/0172; G02B 27/0176;
(Continued)

(56) References Cited

U.S. PATENT DOCUMENTS 6,982,773 B2 1/2006 Kurtz et al.
7,160,017 B2 1/2007 Lee et al.
(Continued)

OTHER PUBLICATIONS

International Search Report and Written Opinion, dated Apr. 23, 2021, for International Patent Application No. PCT/US2021/017089. (10 pages).
(Continued)

*Primary Examiner* — Lin Ye
*Assistant Examiner* — John H Morehead, III
(74) *Attorney, Agent, or Firm* — Seed Intellectual Property Law Group LLP (57) ABSTRACT

Improved illumination optics for various applications. The illumination optics may include an optical beam spreading structure that provides a large spread angle for an incident collimated beam or provides finer detail or resolution compared to convention diffractive optical elements. The optical beam spreading structure may include first and second spatially varying polarizers that are optically aligned with each other. The first and second spatially varying polarizers may be formed of a liquid crystal material, such as a multi-twist retarder (MTR). The first and second spatially varying polarizers may diffract light of orthogonal polarization states, which allows for different diffraction patterns to be used in a single optical structure. The two patterns may provide a combined field of view that is larger than either of the first and second fields of view or may provide finer detail or resolution than the first or second fields of view can provide alone.

21 Claims, 5 Drawing Sheets

(51) Int. Cl.
*G02F 1/13363* (2006.01)
*G02F 1/33* (2006.01)

(52) U.S. Cl.
CPC ... *G02B 27/0176* (2013.01); *G02F 1/133636* (2013.01); *G02F 1/33* (2013.01)

(58) Field of Classification Search
CPC .............. G02B 27/4261; G02B 27/017; G02B 27/283; G02F 1/133636; G02F 1/33
See application file for complete search history.

(56) References Cited

U.S. PATENT DOCUMENTS

| | | | |
|---|---|---|---|
| 7,295,312 | B1 | 11/2007 | Gerhart et al. |
| 3,004,675 | A1 | 8/2011 | Lefaudeux |
| 8,235,533 | B2 | 8/2012 | Hudman et al. |
| 8,368,889 | B2 | 2/2013 | Schwiegerling et al. |
| 8,982,313 | B2 | 3/2015 | Escuti et al. |
| 9,298,041 | B2 | 3/2016 | Escuti et al. |
| 9,335,586 | B2 | 5/2016 | Escuti et al. |
| 9,410,677 | B2 | 8/2016 | Wheatley et al. |
| 10,203,489 | B2 | 2/2019 | Khan et al. |
| 10,877,270 | B2 * | 12/2020 | Border ................... G06F 1/163 |
| 2011/0310220 | A1 | 12/2011 | McEldowney |
| 2012/0188467 | A1 | 7/2012 | Escuti et al. |
| 2013/0286479 | A1 | 10/2013 | Sung et al. |
| 2014/0285878 | A1 * | 9/2014 | Escuti ................. G02B 5/3083 156/60 |
| 2015/0131311 | A1 | 5/2015 | Wheatley et al. |
| 2016/0182889 | A1 | 6/2016 | Olmstead |
| 2016/0349516 | A1 | 12/2016 | Alexander et al. |
| 2018/0172994 | A1 * | 6/2018 | Robbins ............... G02B 26/101 |
| 2018/0335630 | A1 * | 11/2018 | Lu ...................... G02F 1/13439 |
| 2019/0075281 | A1 * | 3/2019 | Hall ..................... G02B 26/10 |
| 2019/0219819 | A1 * | 7/2019 | Hong .................. G02B 27/283 |
| 2019/0243147 | A1 | 8/2019 | Smithwick et al. |
| 2019/0377183 | A1 | 12/2019 | Sharp |
| 2020/0049992 | A1 * | 2/2020 | Peng ..................... G06F 3/012 |
| 2020/0292830 | A1 * | 9/2020 | Fei ...................... G02B 27/288 |
| 2020/0301147 | A1 | 9/2020 | Klug |

OTHER PUBLICATIONS

Hornburg et al., "Multiband retardation control using multi-twist retarders," Proc. of SPIE, Polarization: Measurement, Analysis, and Remote Sensing XI, vol. 9099, 90990Z, 2014, 9 pages.
Hornburg et al., "Wide color gamut multi-twist retarders," Proc. of SPIE, Emerging Liquid Crystal Technologies X, vol. 9384, 93840W, 2015, 11 pages.
Magineoptix, "Consumer Electronics Optics," Augmented and Virtual Reality Optics Technology in Consumer Electronics—ImagineOptix, retrieved from <https://www.imaginoptix.com/applications/consumer-electronics/>, on Dec. 17, 2019, 3 pages.
Komandur et al., "Multi-twist retarders for broadband polarization transformation," Proc. of SPIE, Emerging Liquid Crystal Technologies VII, vol. 8279, 82790E, 2012, 10 pages.
Komanduri et al., "Multi-twist retarders: broadband retardation control using self-aligning reactive liquid crystal layers," Optics Express, Optical Society of America, vol. 21, No. Jan. 1, 14, 2013, 17 pages.
Perreault, "Triple Wollaston-prism complete-Stokes imaging polarimeter," Optics Letters, Optical Society of America, vol. 38, No. 19, Oct. 1, 2013, 4 pages.

* cited by examiner

POLARIZATION-BASED MULTIPLEXING OF DIFFRACTIVE ELEMENTS FOR ILLUMINATION OPTICS

BACKGROUND

Technical Field

The present disclosure generally relates to illumination optics.

Description of the Related Art

Various applications utilize illumination optics that provide an illumination pattern using a collimated beam (e.g., laser beam) and an optical system that spreads the collimated beam (e.g., negative lens, beam splitter). Such applications may include heads-up displays, head-mounted display (HMD) systems, time-of-flight sensors, stereo depth sensors, etc. For example, active stereo camera sensing may use an infrared (IR) projected pattern in conjunction with one or more cameras capable of detecting IR. For particular applications, it may be desirable to provide sensors and illumination optics that operate at larger fields of view and distances with higher resolution.

Because of their reduced size, weight, and their functionality, IR lasers in conjunction with one or more diffractive optical elements (DOEs) have been used as illumination sources or projectors to produce such patterns. However, the field of view or "spread angle" of a DOE is inherently limited by its pitch, or distance between the gratings, which requires a tradeoff between spread angle and detail or resolution. Thus, there is a need to provide illumination optics for various applications that provide larger fields of view and/or provide finer detail or resolution than what is currently available.

As noted above, example applications for such illuminations optics include virtual reality ("VR") experiences that are created using head-mounted displays ("HMDs"), which can be tethered to a stationary computer (such as a personal computer ("PC"), laptop, or game console), combined and/or integrated with a smart phone and/or its associated display, or self-contained. Generally, HMDs are display devices, worn on the head of a user, which have a small display device in front of one (monocular HMD) or each eye (binocular HMD). The display units are typically miniaturized and may include CRT, LCD, Liquid crystal on silicon (LCos), or OLED technologies, for example. A binocular HMD has the potential to display a different image to each eye. This capability is used to display stereoscopic images.

Demand for displays with heightened performance has increased with the development of smart phones, high-definition televisions, as well as other electronic devices. The growing popularity of virtual reality and augmented reality systems, particularly those using HMDs, has further increased such demand. Virtual reality systems typically envelop a wearer's eyes completely and substitute a "virtual" reality for the actual or physical view (or actual reality) in front of the wearer, while augmented reality systems typically provide a semi-transparent or transparent overlay of one or more screens in front of a wearer's eyes such that actual view is augmented with additional information, and mediated reality systems may similarly present information to a viewer that combines real-world elements with virtual elements. In many virtual reality and augmented reality systems, the movement of a wearer of such a head-mounted display may be tracked in various manners, such as via sensors in the head-mounted display and/or external to it, in order to enable the images being shown to reflect user movements.

Positional tracking allows an HMD to estimate its position relative to the environment around it, using a combination of hardware and software to detect absolute position. Positional tracking is an important feature in virtual reality, making it possible to track movement with six degrees of freedom (6DOF). Position tracking facilitates various benefits to the virtual reality experience. For example, position tracking may change the viewpoint of a user to reflect different actions such as ducking, leaning forward, or jumping, and may allow for a representation of the user hands or other objects in the virtual environment. Position tracking also improves the 3D perception of the virtual environment because of parallax (i.e., the way objects closer to the eyes move faster than objects farther away).

There are different methods of positional tracking, including acoustic tracking, inertial tracking, magnetic tracking, optical tracking, etc., and/or combinations thereof. Inside-out tracking is a type positional tracking that may be used to track the position of HMDs and/or related objects (e.g., controllers). Inside-out tracking differs from outside-in tracking by the location of the cameras or other sensors used to determine the HMD's position. For inside-out tracking, the camera or sensors are located on the HMD, or object being tracked, while in outside-out tracking the camera or sensors are placed in a stationary location in the environment.

An HMD that utilizes inside-out tracking utilizes one or more cameras to "look out" to determine how its position changes in relation to the environment. When the HMD moves, the sensors readjust their place in the room and the virtual environment responds accordingly in real-time. This type of positional tracking can be achieved with or without markers placed in the environment.

The cameras that are placed on the HMD observe features of the surrounding environment. When using markers, the markers are designed to be easily detected by the tracking system and placed in a specific area. With "markerless" inside-out tracking, the HMD system uses distinctive characteristics (e.g., natural features) that originally exist in the environment to determine position and orientation. The HMD system's algorithms identify specific images or shapes and use them to calculate the device's position in space. Data from accelerometers and gyroscopes can also be used to increase the precision of positional tracking.

BRIEF SUMMARY

An optical beam spreading structure may be summarized as including a first spatially varying polarizer that is configured to receive an incident light beam from a light source, the first spatially varying polarizer operative to diffract light of a first polarization state over a first field of view, and to pass incident light having a second polarization state orthogonal to the first polarization state without such light being diffracted by the first spatially varying polarizer; and a second spatially varying polarizer optically aligned with the first spatially varying polarizer and positioned to receive light from the first spatially varying polarizer, the second spatially varying polarizer operative to diffract light of the second polarization state over a second field of view, and to pass incident light having the first polarization state without such light being diffracted by the second spatially varying polarizer. Each of the first spatially varying polarizer and the second spatially varying polarizer may include a multi-twist retarder. Each of the first spatially varying polarizer and the second spatially varying polarizer may include a liquid crystal material. The first field of view and the second field of view together may form a combined field of view that is larger than each of the first field of view and the second field of view. The optical beam spreading structure may be a component in a head-mounted display, a heads-up display, a time-of-flight sensor, or a stereo depth sensor. The first spatially varying polarizer may diffract light of the first polarization state into a first diffractive order, and the second spatially varying polarizer may diffract light of the second polarization state into a second diffractive order different from the first diffractive order. One of the first diffractive order and the second diffractive order may include the +1 diffractive order and the other of the first diffractive order and the second diffractive order may include the −1 diffractive order.

The optical beam spreading structure may further include a laser light source operative to generate the incident light beam. The incident light beam may be polarized at an angle that is 45 degrees relative to the first and second polarization states. The first field of view and the second field of view may at least partially overlap each other. The second field of view may be different from the first field of view. One of the first polarization state and the second polarization state may include p polarization and the other of the first polarization state and the second polarization state may include s polarization. The first spatially varying polarizer may implement a negative lens with a tilt in a first direction, and the second spatially varying polarizer may implement a negative lens with a tilt in a second direction different from the first direction. The first spatially varying polarizer may implement a negative lens with a tilt in a first direction, and the second spatially varying polarizer may implement a negative lens with a tilt in a second direction that is opposite the first direction.

An illumination source may be summarized as including a laser light source; and optical beam spreading structure, including a first spatially varying polarizer that is configured to receive an incident light beam from the laser light source, the first spatially varying polarizer operative to diffract light of a first polarization state over a first field of view, and to pass incident light having a second polarization state orthogonal to the first polarization state without such light being diffracted by the first spatially varying polarizer; and a second spatially varying polarizer optically aligned with the first spatially varying polarizer and positioned to receive light from the first spatially varying polarizer, the second spatially varying polarizer operative to diffract light of the second polarization state over a second field of view different from the first field of view, and to pass incident light having the first polarization state without such light being diffracted by the second spatially varying polarizer. Each of the first spatially varying polarizer and the second spatially varying polarizer may include a multi-twist retarder. The first field of view and the second field of view together may form a combined field of view that is larger than each of the first field of view and the second field of view. The illumination source may be a component in a head-mounted display, a heads-up display, a time-of-flight sensor, or a stereo depth sensor. The first spatially varying polarizer may diffract light of the first polarization state into a first diffractive order, and the second spatially varying polarizer may diffract light of the second polarization state into a second diffractive order different from the first diffractive order. One of the first diffractive order and the second diffractive order may include the +1 diffractive order and the other of the first diffractive order and the second diffractive order may include the −1 diffractive order. The incident light beam may be polarized at an angle that is 45 degrees relative to the first and second polarization states. The first spatially varying polarizer may implement a negative lens with a tilt in a first direction, and the second spatially varying polarizer may implement a negative lens with a tilt in a second direction different from the first direction.

A depth camera system may be summarized as including at least one camera; and illumination source, including a laser light source; and optical beam spreading structure including a first spatially varying polarizer that is configured to receive an incident light beam from the laser light source, the first spatially varying polarizer operative to diffract light of a first polarization state over a first field of view, and to pass incident light having a second polarization state orthogonal to the first polarization state without such light being diffracted by the first spatially varying polarizer; and a second spatially varying polarizer optically aligned with the first spatially varying polarizer and positioned to receive light from the first spatially varying polarizer, the second spatially varying polarizer operative to diffract light of the second polarization state over a second field of view, and to pass incident light having the first polarization state without such light being diffracted by the second spatially varying polarizer.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

Systems and methods of the present disclosure are directed to providing improved illumination optics for various applications, such as heads-up displays, head-mounted display (HMD) systems, time-of-flight sensors, stereo depth sensors, etc. According to one non-limiting illustrated implementation, an optical beam spreading structure is provided that is able to provide a relatively large spread angle for an incident collimated beam and/or to provide finer detail or resolution compared to conventional diffractive optical elements, which are limited by their pitch, or distance between gratings.

As discussed further below, the optical beam spreading structure may include a first spatially varying polarizer and a second spatially varying polarizer that are optically aligned with each other. The first and second spatially varying polarizers may be formed of a liquid crystal material, such as a multi-twist retarder (MTR). The first spatially varying polarizer may be configured to receive an incident light beam from a light source, such as a laser source. In at least some implementations, the incident light beam may be polarized at a particular angle. The first spatially varying polarizer may be operative to diffract light of a first polarization state over a first field of view, and to pass incident light having a second polarization state orthogonal to the first polarization state without such light being diffracted by the first spatially varying polarizer. For example, the first spatially varying polarizer may implement a negative lens with a tilt pattern in a first direction for light in the first polarization state. The second spatially varying polarizer may be positioned to receive light from the first spatially varying polarizer, and may be operative to diffract light of the second polarization state over a second field of view, and to pass incident light having the first polarization state without such light being diffracted by the second spatially varying polarizer. For example, the second spatially varying polarizer may implement a negative lens with a tilt pattern in a second direction (e.g., opposite the first direction) for light in the second polarization state. Thus, the first field of view and the second field of view together provide a combined field of view that is larger than either of the first and second fields of view and/or provide finer detail than the first or second fields of view provide alone.

Figure 1:
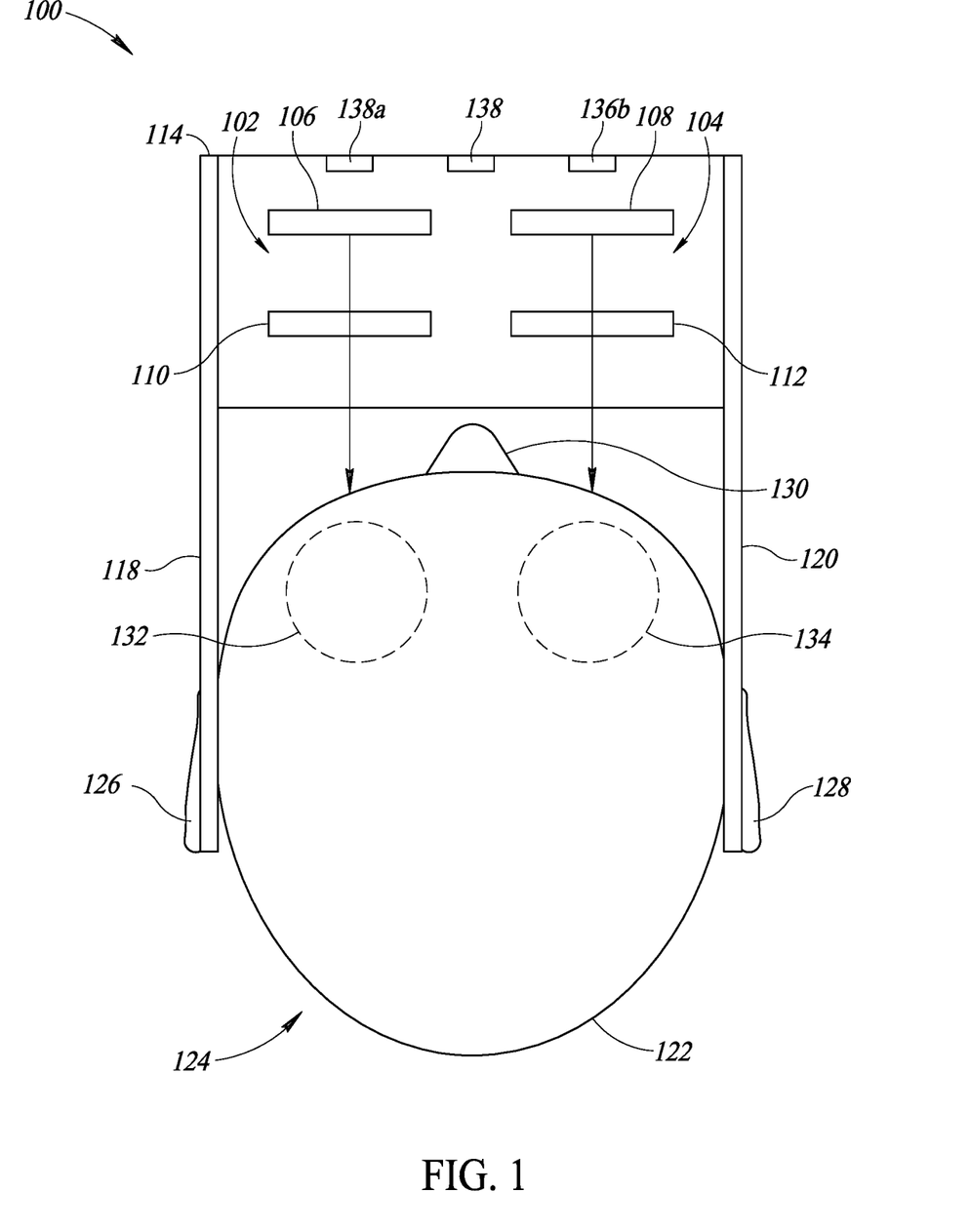
FIG. 1 illustrates a top plan view of a head-mounted display system which includes binocular display, in particular manners in particular embodiments in accordance with the described techniques of the present disclosure.
Figure 2:
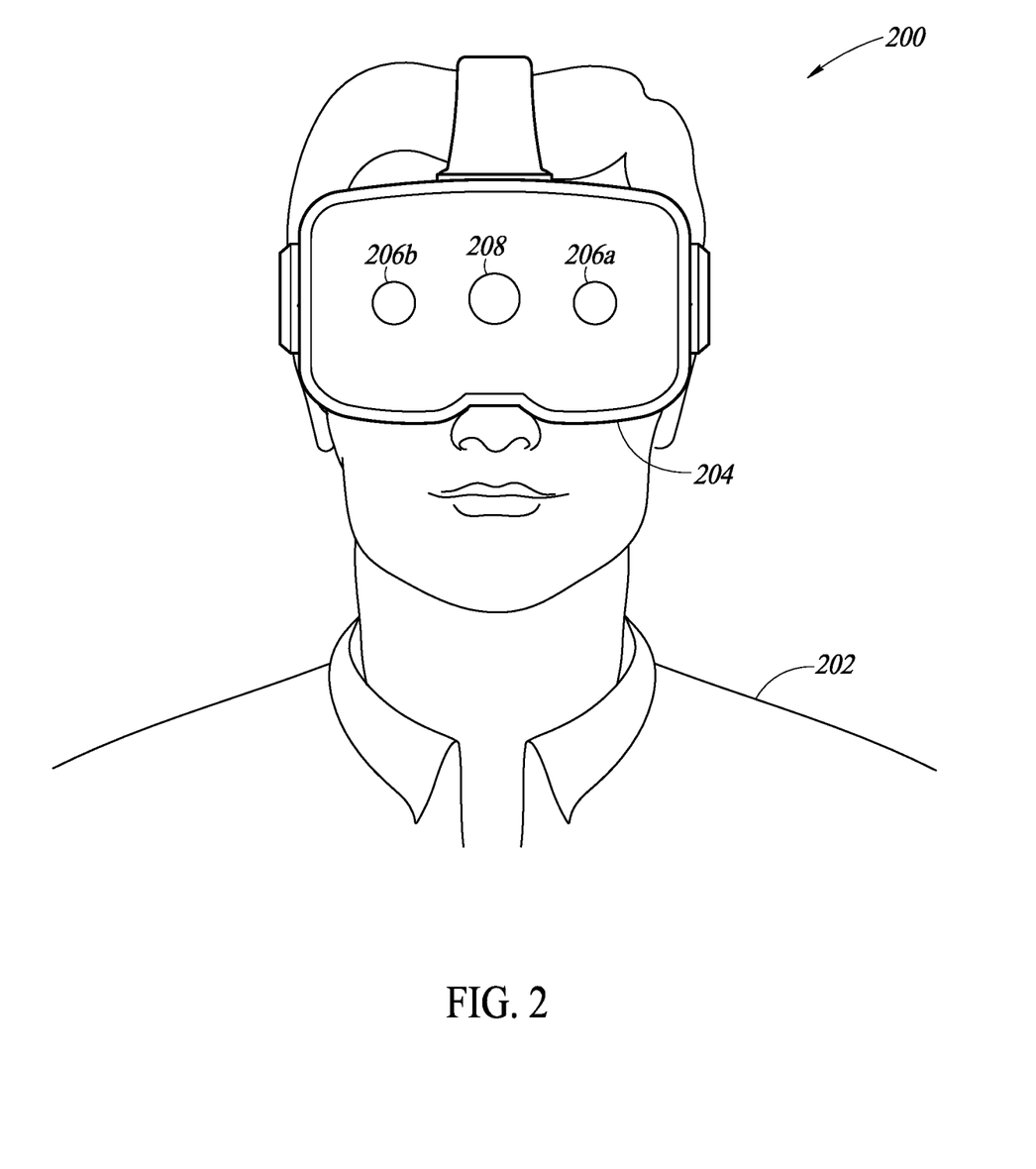
FIG. 2 is a front pictorial diagram of a head-mounted display system which includes binocular display subsystems, and forward cameras and a projector that are components of a stereo depth camera, in particular manners in particular embodiments in accordance with the described techniques of the present disclosure.

Initially, with reference to FIGS. 1 and 2, a non-limiting example HMD system application for the illumination optics of the present disclosure is discussed. As noted above, the features of the present disclosure may be used in numerous applications where it is desirable to use optics that provide relatively large spread angles and/or finer detail relative to conventional DOEs. Then, an embodiment of an illumination source that includes an optical beam spreading structure of the present disclosure is discussed with reference to FIGS. 3-5.

Example Application: Stereo Depth Camera for HMD

FIG. 1 is a simplified top plan view of an HMD system 100 that includes a pair of near-to-eye display systems 102 and 104. The near-to-eye display systems 102 and 104 include displays 106 and 108, respectively (e.g., OLED micro-displays), and respective optical lens systems 110 and 112 that each have one or more optical lenses. The display systems 102 and 104 may be mounted to a support structure or frame 114 or other mounting structure which includes a front portion 116, a left temple 118 and right temple 120. The two display systems 102 and 104 may be secured to the frame 114 in an eye glasses arrangement which can be worn on the head 122 of a user 124. The left temple 118 and right temple 120 may rest over the user's ears 126 and 128, respectively, while a nose assembly (not shown) may rest over the user's nose 130. The frame 114 may be shaped and sized to position each of the two optical systems 110 and 112 in front of one of the user's eyes 132 and 134, respectively. Although the frame 114 is shown in a simplified manner similar to eyeglasses for explanatory purposes, it should be appreciated that in practice more sophisticated structures (e.g., goggles, integrated headband, helmet, straps, etc.) may be used to support and position the displays systems 102 and 104 on the head 122 of user 124.

The HMD system 100 of FIG. 1 is capable of presenting a virtual reality display to the user 124, such as via corresponding video presented at a display rate such as 30 frames (or images) per second or 90 frames per second, while other embodiments of a similar system may present an augmented reality display to the user 124. Each of the displays 106 and 108 may generate light which is transmitted through and focused by the respective optical systems 110 and 112 onto the eyes 132 and 134, respectively, of the user 124. While not illustrated here, each of the eyes includes a pupil aperture through which light passes into the eye, with a typical pupil size ranging from 2 mm (millimeters) in diameter in very bright conditions to as much as 8 mm in dark conditions, while the larger iris in which the pupil is contained may have a size of approximately 12 mm—the pupil (and enclosing iris) may typically move within the visible portion of the eye under open eyelids by several millimeters in the horizontal and/or vertical directions, which will also move the pupil to different depths from the optical lens or other physical elements of the display for different horizontal and vertical positions as the eyeball swivels around its center (resulting in a three dimensional volume in which the pupil can move). The light entering the user's pupils is seen by the user 124 as images and/or video. In some implementations, the distance between each of the optical systems 110 and 112 and the user's eyes 132 and 134 may be relatively short (e.g., less than 30 mm, less than 20 mm), which advantageously causes the HMD system 100 to appear lighter to the user since the weight of the optical systems and the display systems are relatively close to the user's face, and also may provide the user with a greater field of view.

The HMD system 100 may also include forward cameras 136a and 136b which may be cameras of a stereo depth camera 136. The stereo depth camera 136 may be operative to capture image data that may be selectively presented to the user 124, for example, in augmented reality applications or in conjunction with virtual reality applications. Additionally or alternatively, the stereo depth camera 136 may be used by a position tracking system of the HMD system 100 to track the position of the HMD system 100 during use, as discussed elsewhere herein. As an example, each of the cameras 136a and 136b may comprise a video camera and associated lens system that captures images at a frame rate (e.g., 30 Hz, 60 Hz, 90 Hz) in a front camera field of view that has a relatively wide angle (e.g., 60°, 90°, 120°, 150°). Generally, the cameras 136 can be any device capable of capturing an image of at least a portion of the target region. The image can be a color image or can be an grayscale image. As an example, the cameras 136 may include a number of lenses that modify, redirect, and/or focus light entering the cameras through an aperture. A light sensor (e.g., CCD) may receive the light that passes through the lenses and outputs data representative of a plurality of pixels of an image. For example, the data provides an intensity value for each pixel.

The HMD system 100 may also include an illumination source or projector 138 that projects a light pattern (e.g., structured light pattern) toward a target region or environment. The target region or environment may be any number of different ranges of distances from the HMD system 100, including ranges on the order of meters, centimeters, millimeters, etc., depending on the particular application. As non-limiting example, the projector 138 may generate structured light pattern can include a plurality of dots, lines, grids, coded or non-coded patterns, or other patterns that are detectable by the cameras 136.

As discussed further below with reference to FIGS. 3-5, the projector 138 may include one or more light sources and an optical beam spreading structure operative to spread a collimated beam. The projector 138 may also include control circuitry (e.g., controller 334 of FIG. 5) to control the operation of the one or more light sources or the optical beam spreading structure. The one or more light sources can include one or more lasers (e.g., IR lasers), light emitting diodes (LEDs), lamps, other light sources, or some combination thereof.

The optical beam spreading structure transforms or otherwise alters light emitted by the light source(s) into the desired light pattern. In some implementations, the optical beam spreading structure is static. For example, the optical beam spreading structure may focus or defocus exiting light to a single depth of focus. As another example, the optical beam spreading structure may have particular diffractive patterns that results in diffraction of exiting light to form the desired structured light pattern, as discussed further below.

In other implementations, the optical beam spreading structure enables dynamic focus modulation (i.e., different diffractive patterns may be selectively applied to impart various different focuses to the exiting light). As one example, the optical beam spreading structure may include liquid crystal materials, such as multi-twist retarders, that enables high-frequency switchable diffraction patterns.

While not illustrated in FIG. 1, some embodiments of such an HMD system 100 may include various additional internal and/or external sensors, such as to perform pupil tracking separately for each eye 132 and 134, to track head location and orientation (e.g., as part of head tracking), to track various other types of movements and position of the user's body, other cameras to record external images (e.g., of an environment), etc.

Further, while the described techniques may be used in some embodiments with a display system similar to that illustrated in FIG. 1, in other embodiments other types of display systems may be used, including with a single optical lens and display device, or with multiple such optical lenses and display devices. Non-exclusive examples of other such devices include cameras, telescopes, microscopes, binoculars, spotting scopes, surveying scopes, etc. In addition, the described techniques may be used with a wide variety of display panels or other display devices that emit light to form images, which one or more users view through one or more optical lens. In other embodiments, the user may view one or more images through one or more optical lens that are produced in manners other than via a display panel, such as on a surface that reflects light from another light source in part or in whole.

The HMD system 100 may include a processor and a memory which may be physically local or remote from the HMD system. The processor can be one processor or a plurality of processors that are operatively coupled together. The processor can be any processing device, such as a microprocessor, microcontroller, integrated circuit, circuitry that implements computer logic, or some combination thereof. The memory can include any non-transitory information storage device, including, but not limited to, RAM, ROM, hard drives, flash drives, optical media, other memory devices, or some combination thereof. The memory can store information accessible by processor, including instructions that can be executed by processor. The instructions can be any set of instructions that when executed by the processor, cause the processor to provide desired functionality. The memory can also store data.

The HMD system 100 may include a depth determiner module or circuitry that is operative determine a plurality of depth values for one or more images captured by the cameras 136. In some implementations, the depth determiner includes processor-executable instructions stored in or loaded into memory and executed by processor. In other implementations, the depth determiner includes one or more circuits (e.g., integrated circuits), logic components, or other items of computer hardware arranged to implement computer logic or perform other functionality. In other implementations, the depth determiner can be implemented using some combination of processor-executable instructions or data and circuitry.

The HMD system 100 may be coupled to a network, which can be any type of communications network, such as a local area network (e.g., intranet), a wide area network (e.g., Internet), an internal device bus, or some combination thereof and can include any number of wired or wireless links. In general, communication between the components of the HMD system 100 via the network can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

Although the example provided is an HMD system for explanatory purposes, the functionality provided may be utilized for various other devices or applications. For example, the functionality may be provided in a depth camera system embedded within a vehicle, test equipment, an artificial intelligence device, an automation system, or any other system or device for which determination of depth values is beneficial. In other implementations, the features of the present disclosure may be provide in a desktop computer, laptop computer, tablet computer, smartphone, gaming console, one or more server computing devices, or some combination thereof, and may be used to provide other functionality.

FIG. 2 shows a front view of an example HMD system 200 when worn on the head of a user 202. The HMD system 200 includes a support structure 204 that supports the front facing or forward stereo depth cameras 206a and 206b and a projector 208. The camera 206a may be referred to herein as the left camera 206a and the camera 206b may be referred to herein as the right camera 206b. The stereo depth cameras 206a and 206b may be similar or identical to the cameras 136a and 136b discussed above with reference to FIG. 1. Likewise, the projector 208 may be similar or identical to the projector 138 of FIG. 1.

The above discussion is provided to present example applications of the illumination optics of the present disclosure. As noted above, the features of the present disclosure may be utilized in numerous other applications, including heads-up displays, time-of-flight sensors, other devices that utilize illumination optics, etc.

Example Illumination Source

Figure 3A:
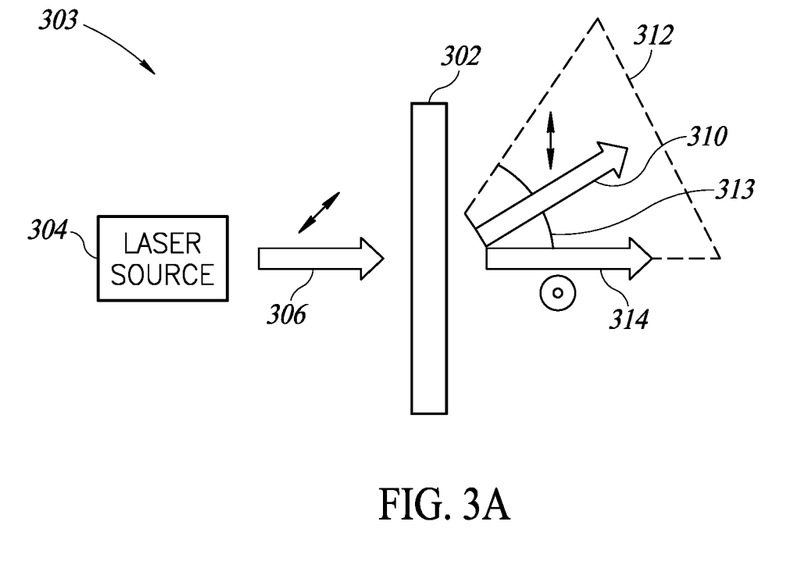
FIG. 3A is a side sectional view of a first spatially varying polarizer of an optical beam spreading structure, illustrating the functionality thereof, according to one non-limiting illustrated implementation.
Figure 3B:
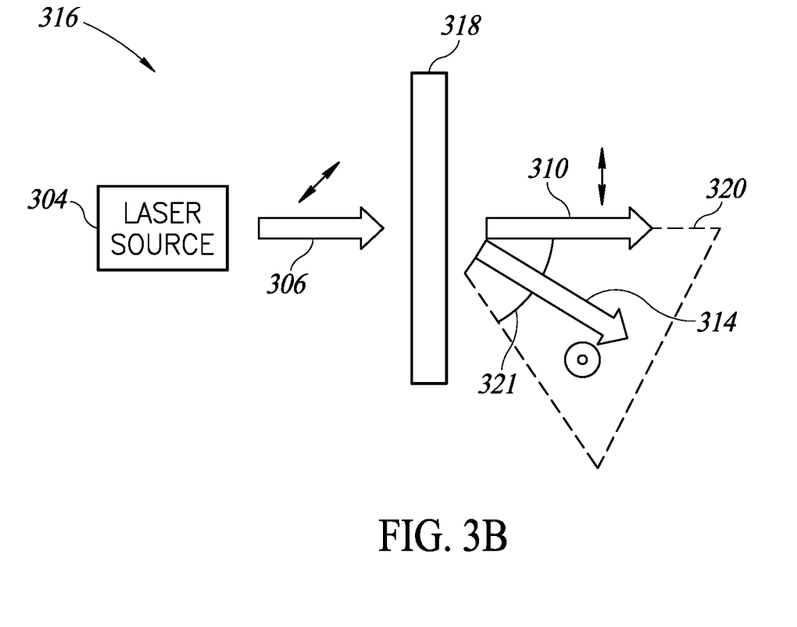
FIG. 3B is a side sectional view of a second spatially varying polarizer of an optical beam spreading structure, illustrating the functionality thereof, according to one non-limiting illustrated implementation.
Figure 4A:
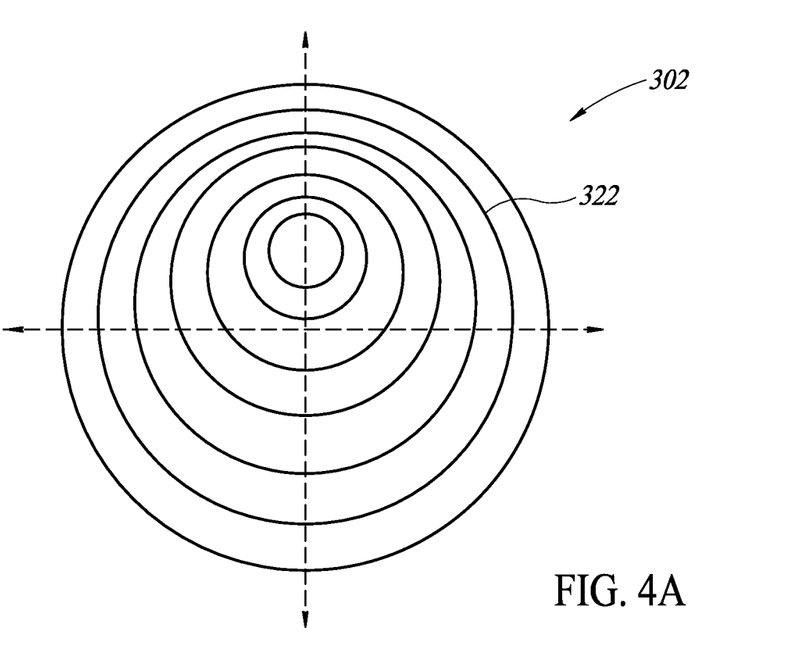
FIG. 4A is a plan view of the first spatially varying polarizer, showing an example phase profile thereof, according to one non-limiting illustrated implementation.
Figure 4B:
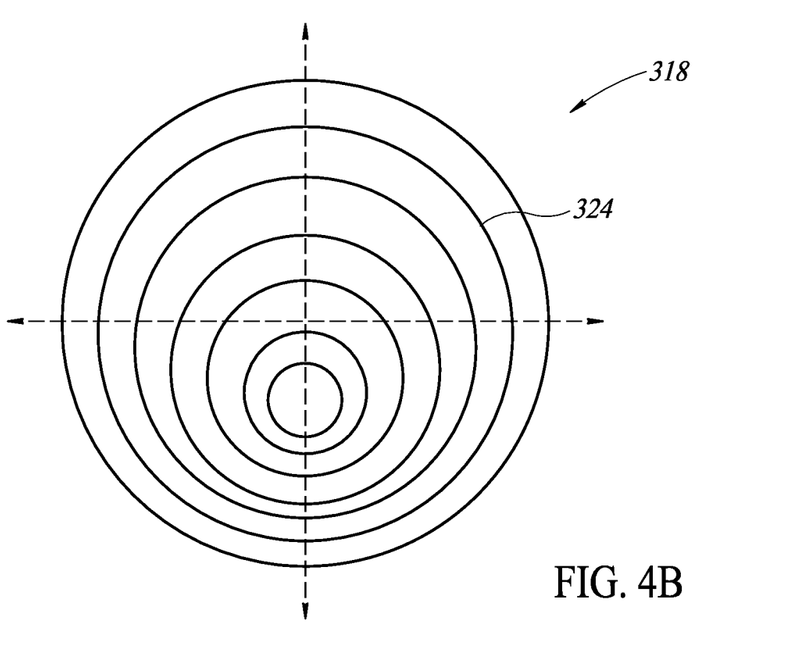
FIG. 4B is a plan view of the second spatially varying polarizer, showing an example phase profile thereof, according to one non-limiting illustrated implementation.
Figure 5:
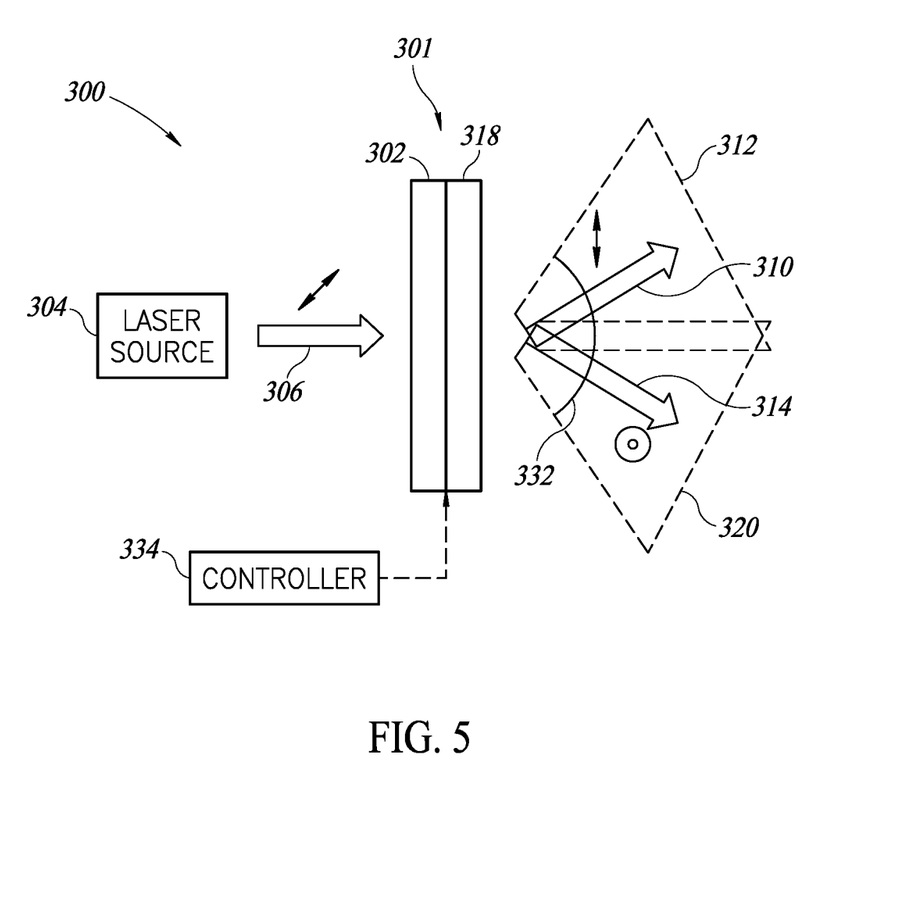
FIG. 5 is a side sectional view of an illumination source including the optical beam spreading structure which includes the first spatially varying polarizer and the second spatially varying polarizer, according to one non-limiting illustrated implementation.

FIGS. 3-5 illustrate an example illumination source 300 (FIG. 5) that may be used in various applications, such as the stereo depth camera application discussed above or other applications. As discussed further below, in the illustrated example the illumination source 300 includes an optical beam spreading structure 301 (FIG. 5) that includes first and second spatially varying polarizers 302 and 318. FIG. 3A is a side sectional view of the first spatially varying polarizer 302 illustrating the functionality thereof, and FIG. 3B is a side sectional view of the second spatially varying polarizer 318 illustrating the functionality thereof. FIGS. 4A and 4B are a plan views of the first and second spatially varying polarizers 302 and 318, respectively, showing example phase profiles thereof. FIG. 5 is a side sectional view of the illumination source 300 including the assembled optical beam spreading structure 301 which includes the first and second spatially varying polarizers 302 and 318, according to one non-limiting illustrated implementation.

One or both of the first and second spatially varying polarizers 302 and 318 of the optical beam spreading structure 301 may include a wave retarder that is formed of birefringent materials. Birefringence is the property of a material that has a refractive index that depends on the polarization and propagation direction of light. The wave retarder alters the polarization state or phase of light traveling through the wave retarder. The wave retarder may have a slow axis (or extraordinary axis) and a fast axis (ordinary axis). As polarized light travels through the wave retarder, the light along the fast axis travels more quickly than along the slow axis.

In at least some implementations, the spatially varying polarizers 302 and 318 may be formed of a multi-twist retarder (MTR), which is a waveplate-like retardation film that provides precise and customized levels of broadband, narrowband or multiple band retardation in a single thin film. More specifically, MTR comprises two or more twisted liquid crystal (LC) layers on a single substrate and with a single alignment layer. Subsequent LC layers are aligned directly by prior layers, allowing simple fabrication, achieving automatic layer registration, and resulting in a monolithic film with a continuously varying optic axis.

FIG. 3A shows a view 303 the operation of the first spatially varying polarizer 302, which is shown separately from the second spatially varying polarizer 318 shown in FIG. 3B for explanatory purposes. A light source 304 generates a collimated beam 306 that is linearly polarized at an angle (e.g., 45 degrees). Although not shown, optical structures (e.g., polarizers) may be provided to shape the beam 306 into a suitable pattern and polarization state. The first spatially varying polarizer 302 includes a diffraction pattern 322 (FIG. 4A) that is designed to diffract light 310 of a first polarization state over a first field of view 312 at a spread angle 313, and to pass incident light 314 having a second polarization state orthogonal to the first polarization state without such light 314 being diffracted by the first spatially varying polarizer 302. In the illustrated example, the light source 304 provides a collimated light beam 306 that is polarized at a 45 degree angle relative to both the first polarization state (e.g., p polarization) and the second polarization state (e.g., s polarization). The first spatially varying polarizer 302 is configured to diffract light 310 of the first polarization state at an upward tilt (as shown) over the field of view 312 which has the spread angle 313. As an example, the diffraction pattern 322 of the first spatially varying polarizer 302 may be designed to implement a combination of a negative lens with a tilt pattern designed for a particular diffraction order (e.g., +1, −1, etc.).

As shown in FIG. 3B, the second spatially varying polarizer 318 includes a diffraction pattern 324 (FIG. 4B) that is designed to diffract light 314 of the second polarization state over a second field of view 320 at a spread angle 321, and to pass incident light 310 having the first polarization state orthogonal to the second polarization state without such light 310 being diffracted by the second spatially varying polarizer 318. In the illustrated example, the second spatially varying polarizer 318 is configured to diffract light 314 of the second polarization state at an downward tilt (as shown) over the second field of view 320 which has the spread angle 321. As an example, the diffraction pattern 324 of the second spatially varying polarizer 318 may be designed to implement a combination of a negative lens with a tilt pattern designed for a particular diffraction order (e.g., +1, −1, etc.). In at least some implementations, the tilt pattern of the second spatially varying polarizer 318 may be in a different direction (e.g., opposite direction) from the tilt pattern of the first spatially varying polarizer 302. For example, the first spatially varying polarizer 302 may be designed toward the +1 diffraction order and the second spatially varying polarizer 318 may be designed toward the −1 diffraction order.

FIG. 5 shows the illumination source 300 that includes the optical beam spreading structure 301 when the first and second spatially varying polarizers 302 and 318 are optically aligned with each other. As shown, the first spatially varying polarizer 302 diffracts light 310 of the first polarization state at an upward tilt (as shown) over the field of view 312 at the spread angle 313, and the second spatially varying polarizer 318 diffracts light 314 of the second polarization state at an downward tilt over the second field of view 320 at the spread angle 321. Thus, the first and second fields of view 312 and 320 together provide a combined field of view having a spread angle 332 that is larger than the first and second fields of view. As a non-limiting example, if the first and second fields of view each have a spread angle of 30 degrees and overlap each other by 10 degrees, the combined field of view may have a spread angle of 50 degrees (i.e., 30°+30°−10°=50°).

In at least some implementations, the first spatially varying polarizer 302 diffracts light of the first polarization state into a first diffractive order, and the second spatially varying polarizer 318 diffracts light of the second polarization state into a second diffractive order different from the first diffractive order. As a non-limiting example, one of the first diffractive order and the second diffractive order may include the +1 diffractive order and the other of the first diffractive order and the second diffractive order may include the −1 diffractive order.

As shown in FIG. 5, in at least some implementations the first field of view 312 and the second field of view 320 may at least partially overlap each other, although such feature is not required. In at least some implementations, the second field of view 320 is different from the first field of view 312. In other implementations, the first and second fields of view 312 and 320 are substantially the same, but together provide greater resolution than could be provided using a single diffractive optical element. As can be appreciated, if the overlap between the two fields of view is minimal, the combined field of view may be nearly double the individual fields of view without loss of resolution.

In at least some implementations, the optical beam spreading structure 301 may be operatively coupled to a controller 334 to selectively vary the spatially-dependent phase retardation of the first or second spatially varying polarizers 302 and 318 to any desired configuration, thereby providing a variable combined field of view. In such implementations, one or more electrode layers (e.g., thin film transistor (TFT) layers) may be provided that allow the spatially-dependent phase retardation of the first and second spatially varying polarizer 302 and 318 to be selectively controlled by the controller 334. The controller 334 may control the phase retardation at any desired rate, such as one time only, periodically, or at a rate on the order of milliseconds or microseconds. As another example, each of the spatially varying polarizers 302 and 318 may include a stack of two or more layers that may each be selectively switched by the controller 334 between an active state and an inactive state to provide the desired polarization characteristics.

It will be appreciated that the illustrated systems and devices are merely illustrative and are not intended to limit the scope of the present disclosure. Such computing systems or devices may comprise any combination of hardware that can interact and perform the described types of functionality, such as when programmed or otherwise configured with appropriate software, including without limitation desktop computers, laptop computers, slate computers, tablet computers or other computers, smart phone computing devices and other cell phones, Internet appliances, PDAs and other electronic organizers, database servers, network storage devices and other network devices, wireless phones, pagers, television-based systems (e.g., using set-top boxes and/or personal/digital video recorders and/or game consoles and/or media servers), and various other consumer products that include appropriate inter-communication capabilities. For example, the illustrated systems may include executable software instructions and/or data structures in at least some embodiments, which when loaded on and/or executed by particular computing systems or devices, may be used to program or otherwise configure those systems or devices, such as to configure processors of those systems or devices. Alternatively, in other embodiments, some or all of the software systems may execute in memory on another device and communicate with the illustrated computing system/device via inter-computer communication. In addition, while various items are illustrated as being stored in memory or on storage at various times (e.g., while being used), these items or portions of them can be transferred between memory and storage and/or between storage devices (e.g., at different locations) for purposes of memory management and/or data integrity.

Thus, in at least some embodiments, the illustrated systems are software-based systems including software instructions that, when executed by the processor(s) and/or other processor means, program the processor(s) to automatically perform the described operations for that system. Furthermore, in some embodiments, some or all of the systems may be implemented or provided in other manners, such as at least partially in firmware and/or hardware means, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the systems or data structures may also be stored (e.g., as software instructions contents or structured data contents) on a non-transitory computer-readable storage medium, such as a hard disk or flash drive or other non-volatile storage device, volatile or non-volatile memory (e.g., RAM), a network storage device, or a portable media article (e.g., a DVD disk, a CD disk, an optical disk, a flash memory device, etc.) to be read by an appropriate drive or via an appropriate connection. The systems, modules and data structures may also in some embodiments be transmitted as generated data signals (e.g., as part of a carrier wave or other analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the present disclosure may be practiced with other computer system configurations.

Those of skill in the art will recognize that many of the methods or algorithms set out herein may employ additional acts, may omit some acts, and/or may execute acts in a different order than specified.

The various implementations described above can be combined to provide further implementations. These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. An optical beam spreading structure, comprising:
   a first spatially varying polarizer that is configured to receive an incident light beam from a light source, the first spatially varying polarizer operative to diffract light of a first polarization state over a first field of view, and to pass incident light having a second polarization state orthogonal to the first polarization state without such light being diffracted by the first spatially varying polarizer; and
   a second spatially varying polarizer optically aligned with the first spatially varying polarizer and positioned to receive light from the first spatially varying polarizer, the second spatially varying polarizer operative to diffract light of the second polarization state over a second field of view, and to pass incident light having the first polarization state without such light being diffracted by the second spatially varying polarizer,
   wherein the first spatially varying polarizer implements a negative lens with a tilt in a first direction, and the second spatially varying polarizer implements a negative lens with a tilt in a second direction different from the first direction.

2. The optical beam spreading structure of claim 1 wherein each of the first spatially varying polarizer and the second spatially varying polarizer comprises a multi-twist retarder.

3. The optical beam spreading structure of claim 1 wherein each of the first spatially varying polarizer and the second spatially varying polarizer comprises a liquid crystal material.

4. The optical beam spreading structure of claim 1 wherein the first field of view and the second field of view together form a combined field of view that is larger than each of the first field of view and the second field of view.

5. The optical beam spreading structure of claim 1 wherein the optical beam spreading structure is a component in a head-mounted display, a heads-up display, a time-of-flight sensor, or a stereo depth sensor.

6. The optical beam spreading structure of claim 1 wherein the first spatially varying polarizer diffracts light of the first polarization state into a first diffractive order, and the second spatially varying polarizer diffracts light of the second polarization state into a second diffractive order different from the first diffractive order.

7. The optical beam spreading structure of claim 6 wherein one of the first diffractive order and the second diffractive order comprises the +1 diffractive order and the other of the first diffractive order and the second diffractive order comprises the −1 diffractive order.

8. The optical beam spreading structure of claim 1, further comprising:
   a laser light source operative to generate the incident light beam.

9. The optical beam spreading structure of claim 1 wherein the incident light beam is polarized at an angle that is 45 degrees relative to the first and second polarization states.

10. The optical beam spreading structure of claim 1 wherein the first field of view and the second field of view at least partially overlap each other.

11. The optical beam spreading structure of claim 1 wherein the second field of view is different from the first field of view.

12. The optical beam spreading structure of claim 1 wherein one of the first polarization state and the second polarization state comprises p polarization and the other of the first polarization state and the second polarization state comprises s polarization.

13. The optical beam spreading structure of claim 1 wherein the second direction is opposite the first direction.

14. An illumination source, comprising:
   a laser light source; and
   optical beam spreading structure, comprising:
      a first spatially varying polarizer that is configured to receive an incident light beam from the laser light source, the first spatially varying polarizer operative to diffract light of a first polarization state over a first field of view, and to pass incident light having a second polarization state orthogonal to the first polarization state without such light being diffracted by the first spatially varying polarizer; and
      a second spatially varying polarizer optically aligned with the first spatially varying polarizer and positioned to receive light from the first spatially varying polarizer, the second spatially varying polarizer operative to diffract light of the second polarization state over a second field of view different from the first field of view, and to pass incident light having the first polarization state without such light being diffracted by the second spatially varying polarizer,
      wherein the first spatially varying polarizer implements a negative lens with a tilt in a first direction, and the second spatially varying polarizer implements a negative lens with a tilt in a second direction different from the first direction.

15. The illumination source of claim 14 wherein each of the first spatially varying polarizer and the second spatially varying polarizer comprises a multi-twist retarder.

16. The illumination source of claim 14 wherein the first field of view and the second field of view together form a combined field of view that is larger than each of the first field of view and the second field of view.

17. The illumination source of claim 14 wherein the illumination source is a component in a head-mounted display, a heads-up display, a time-of-flight sensor, or a stereo depth sensor.

18. The illumination source of claim 14 wherein the first spatially varying polarizer diffracts light of the first polarization state into a first diffractive order, and the second spatially varying polarizer diffracts light of the second polarization state into a second diffractive order different from the first diffractive order.

19. The illumination source of claim 18 wherein one of the first diffractive order and the second diffractive order comprises the +1 diffractive order and the other of the first diffractive order and the second diffractive order comprises the −1 diffractive order.

20. The illumination source of claim 14 wherein the incident light beam is polarized at an angle that is 45 degrees relative to the first and second polarization states.

21. A depth camera system, comprising:
   at least one camera; and
   illumination source, comprising:
      a laser light source; and
      optical beam spreading structure comprising:
         a first spatially varying polarizer that is configured to receive an incident light beam from the laser light source, the first spatially varying polarizer operative to diffract light of a first polarization state over a first field of view, and to pass incident light having a second polarization state orthogonal to the first polarization state without such light being diffracted by the first spatially varying polarizer; and a second spatially varying polarizer optically aligned with the first spatially varying polarizer and positioned to receive light from the first spatially varying polarizer, the second spatially varying polarizer operative to diffract light of the second polarization state over a second field of view, and to pass incident light having the first polarization state without such light being diffracted by the second spatially varying polarizer, wherein the first spatially varying polarizer implements a negative lens with a tilt in a first direction, and the second spatially varying polarizer implements a negative lens with a tilt in a second direction different from the first direction.

* * * * *